W. C. BRIGGS.
VENDING MACHINE.
APPLICATION FILED FEB. 6, 1907. RENEWED OCT. 15, 1908.
917,997.
Patented Apr. 13, 1909.
4 SHEETS—SHEET 1.
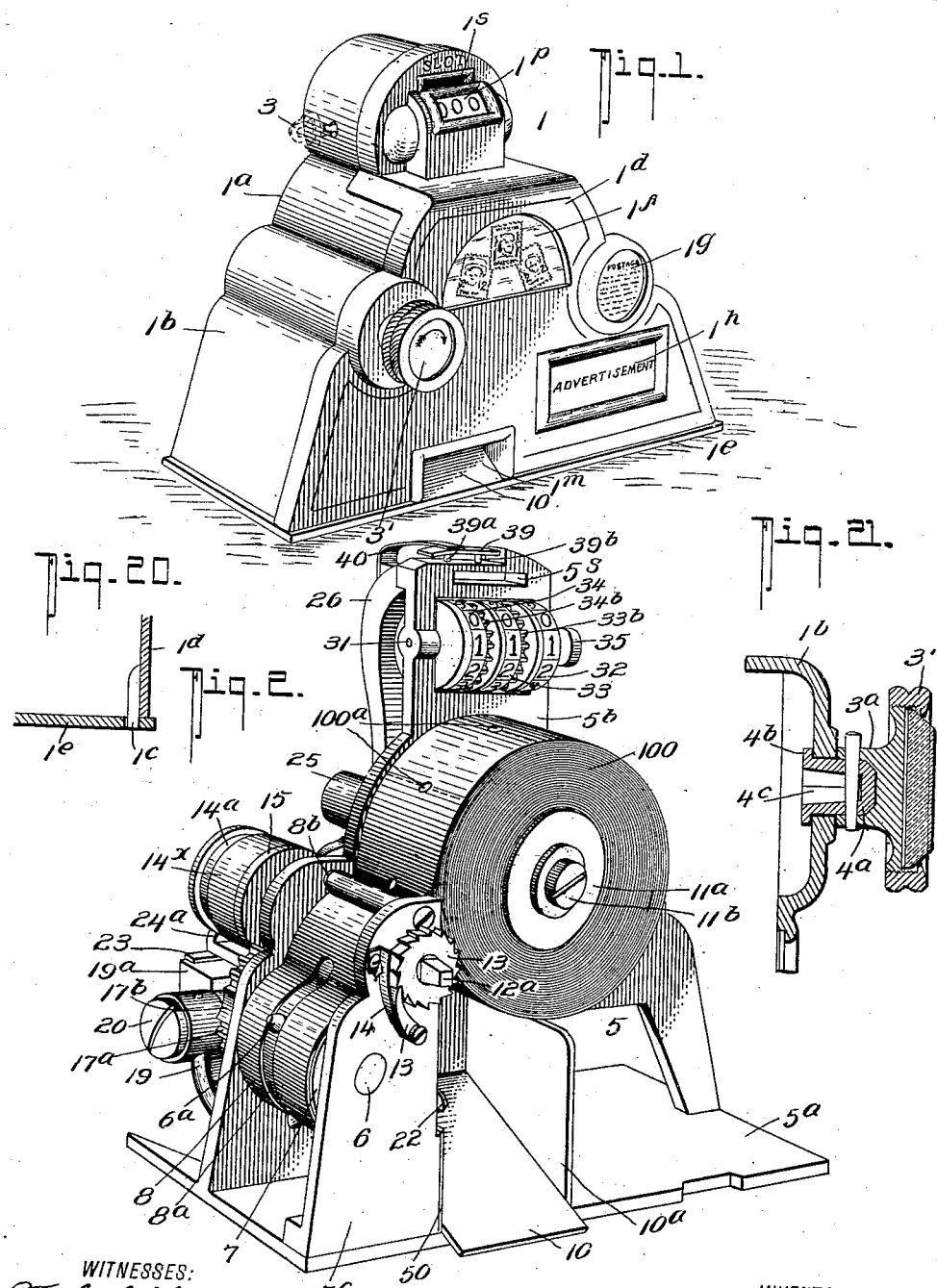
WITNESSES:
F. C. Gibson.
John T. Schrott.
INVENTOR
William C. Briggs.
BY
Fred G. Dieterich
ATTORNEYS

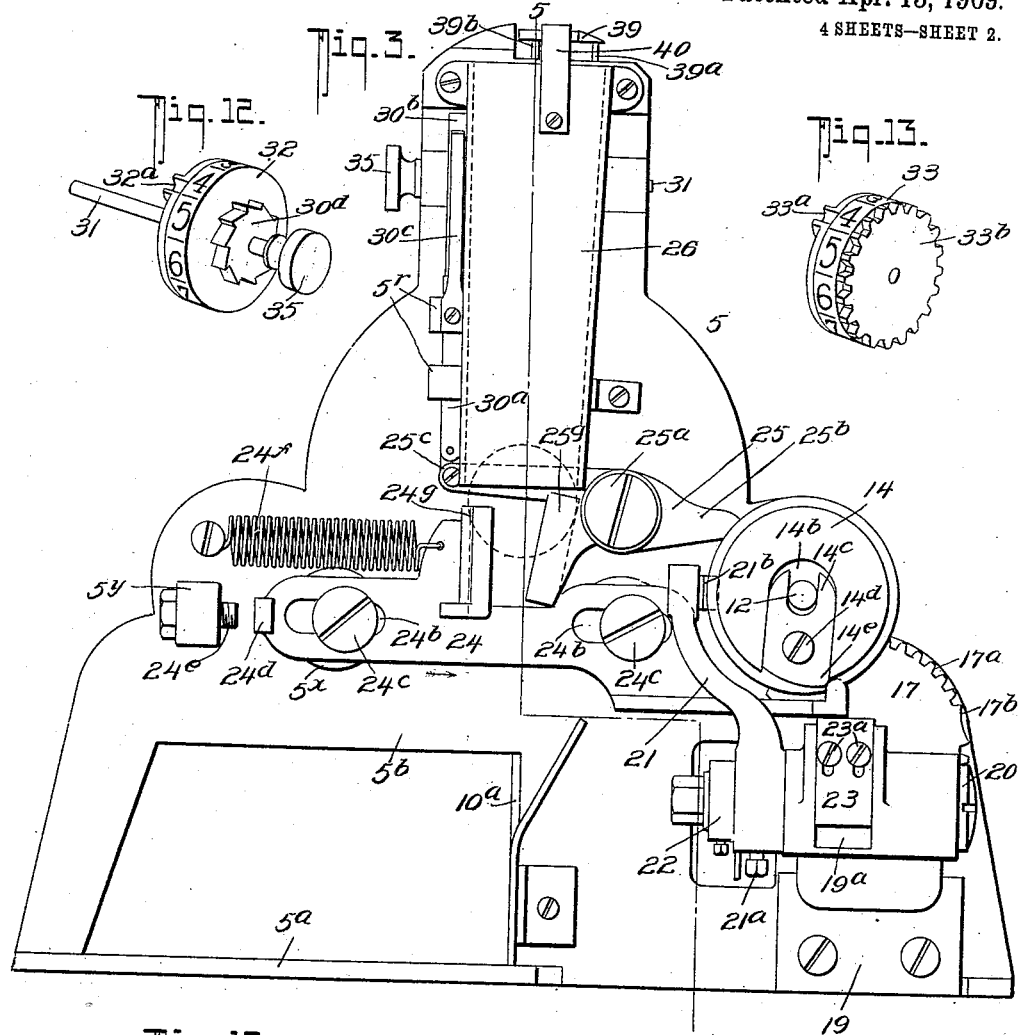
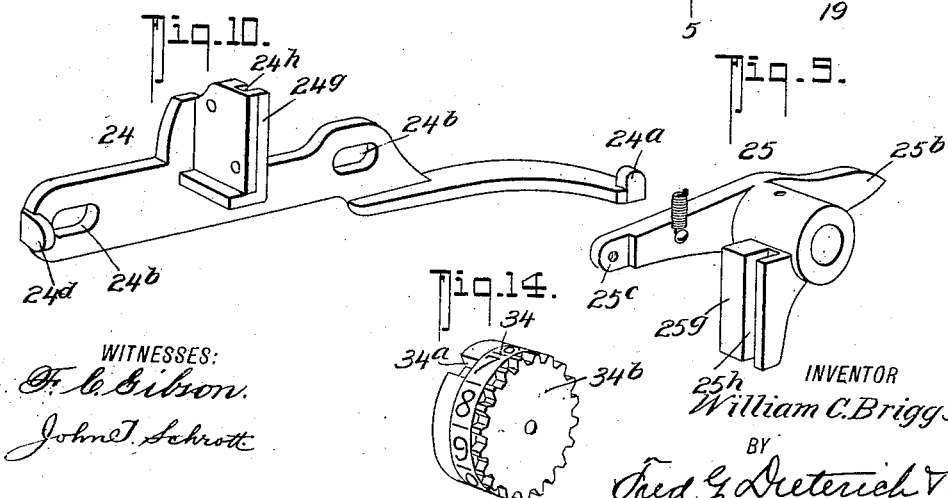

W. C. BRIGGS.
VENDING MACHINE.
APPLICATION FILED FEB. 6, 1907. RENEWED OCT. 15, 1908.
917,997.
Patented Apr. 13, 1909.
4 SHEETS—SHEET 3.
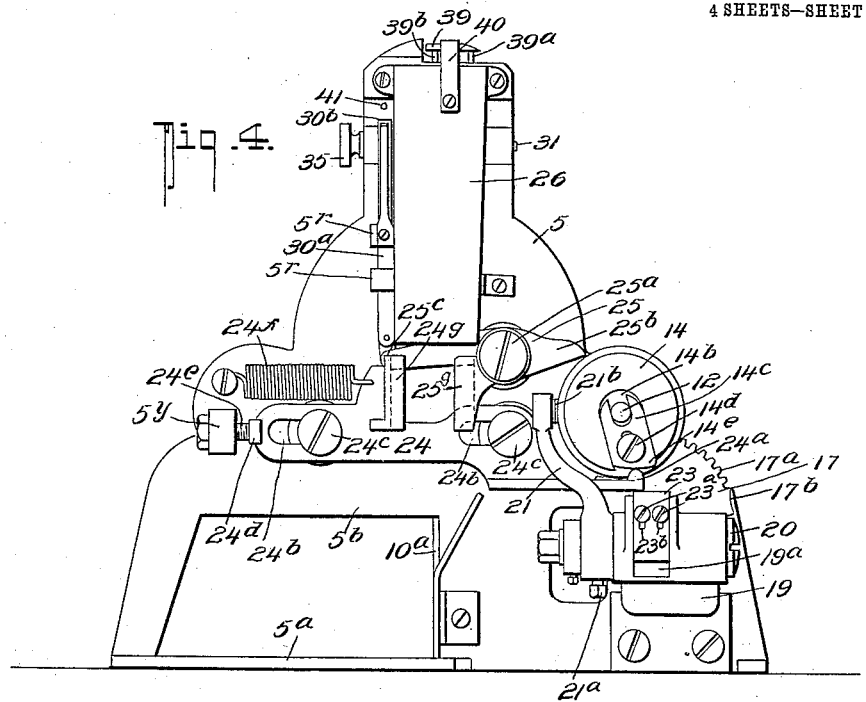
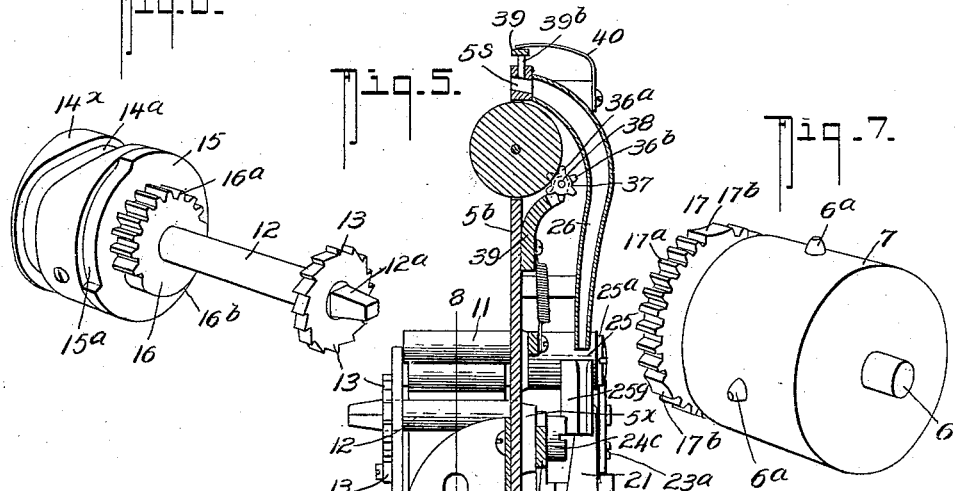

W. C. BRIGGS.
VENDING MACHINE.
APPLICATION FILED FEB. 6, 1907. RENEWED OCT. 15, 1908.
917,997.
Patented Apr. 13, 1909.
4 SHEETS—SHEET 4.
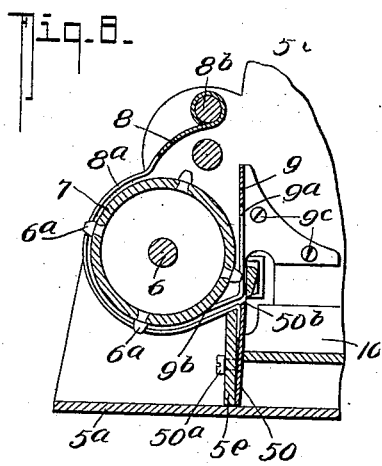
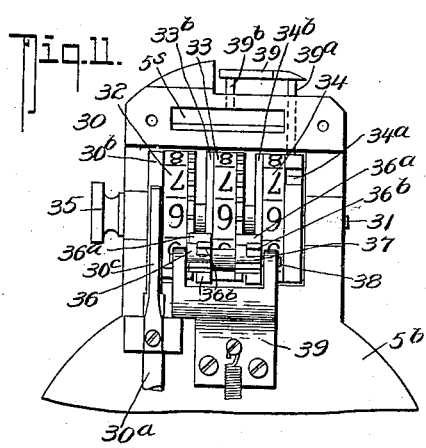
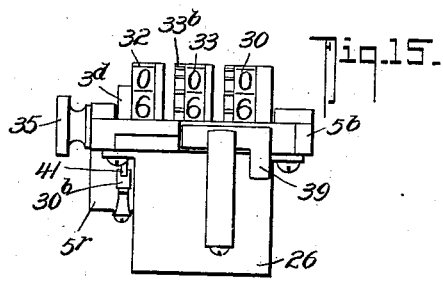
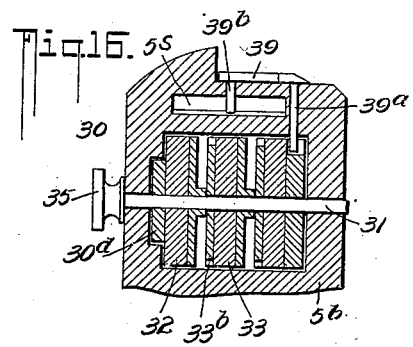
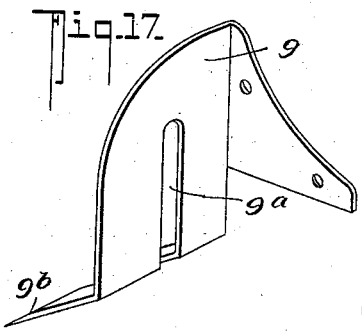
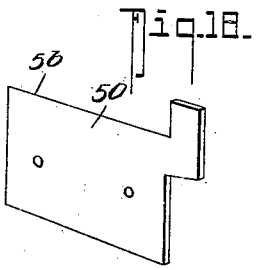
WITNESSES:
F. C. Gibson
John T. Schrott
INVENTOR
William C. Briggs.
BY
Fred G. Dieterich
ATTORNEYS

UNITED STATES PATENT OFFICE.

WILLIAM CYRUS BRIGGS, OF WINSTON SALEM, NORTH CAROLINA, ASSIGNOR, BY DIRECT AND MESNE ASSIGNMENTS, TO THE NATIONAL STAMP VENDING MACHINE COMPANY, OF FAYETTEVILLE, NORTH CAROLINA, A CORPORATION OF NORTH CAROLINA.

VENDING-MACHINE.

No. 917,997.     Specification of Letters Patent.     Patented April 13, 1909.

Application filed February 6, 1907, Serial No. 356,101. Renewed October 15, 1908. Serial No. 457,914.

*To all whom it may concern:*

Be it known that I, WILLIAM CYRUS BRIGGS, residing at Winston Salem, in the county of Forsyth and State of North Carolina, have invented certain new and useful Improvements in Vending-Machines, of which the following is a specification.

My invention relates to certain new and useful improvements in vending machines of the coin operated type, and in its generic nature my invention comprises a vending machine of this type of a very simple and effective construction which can be easily and cheaply manufactured and which will readily and effectively serve its intended purposes.

My invention has for its object to provide a machine of the coin operated type which can be used for vending small articles, such as postage stamps, railway tickets or the like, and in its generic nature the invention comprises a continuous ribbon-like envelop or holder for containing the articles to be vended, a feeding means for the holder, means for cutting the continuous envelop in sections, coin operated devices for controlling the operation of the feeding devices and the cutting devices, and a registering mechanism coöperating with the coin controlling mechanism and the ribbon feeding mechanism for indicating the number of sales made, together with means for locking the coin operating mechanism, the feeding mechanism and the cutting mechanism from operation after the contents of the machine have been vended.

In its more detail nature, the invention includes certain novel construction, combination and arrangement of parts, all of which will be first described in detail, and then be specifically pointed out in the appended claims, reference being had to the accompanying drawings, in which:—

Figure 1, is a perspective view of the invention. Fig. 2, is a perspective view of the invention, the casing being removed. Fig. 3, is a rear elevation of the parts shown in Fig. 2, the parts being in their locked position and a coin just having been dropped in the slot. Fig. 4, is a similar view showing the position of the parts after the coin has been ejected and the feeding and cutting mechanism unlocked. Fig. 5, is a cross section on the line 5—5 of Fig. 3. Fig. 6, is a detail perspective view of the cam disk and lock carrying shaft. Fig. 7, is a similar view of the feed drum and its shaft. Fig. 8, is a detail cross section on the line 8—8 of Fig. 5. Fig. 9, is a detail perspective view of the coin controlled locking and registering lever. Fig. 10, is a similar view of the coin pusher bar. Fig. 11, is a detail rear elevation similar to Fig. 3, of the registering mechanism, the coin chute being removed. Fig. 12, is a detail perspective view of the "units" registering disk and the parts which turn therewith. Fig. 13, is a similar view of the "tens" registering disk. Fig. 14, is a perspective view of the "hundreds" registering disk. Fig. 15, is a detail top plan view of the registering mechanism and coin chute. Fig. 16, is a detail sectional view showing the coin slot and registering mechanism locking devices in the position to lock the registering mechanism and the coin slot from operation. Fig. 17, is a detail perspective view of the fixed knife blade. Fig. 18, is a detail perspective view of the knife guard. Fig. 19, is a detail sectional perspective view of the casing showing the casing locking mechanism. Figs. 20 and 21, are detail sections of parts of my invention.

Referring now to the accompanying drawings in which like letters and numerals of reference indicate like parts in all of the figures 1 designates the casing which comprises the back $1^a$ and sides $1^b$ integrally formed with one another, and the front $1^d$ which is secured in place by lugs $1^c$ entering slots $1^x$ in the base $1^e$ of the casing and by a lock 2 which is controlled by a key 3 (see dotted lines Fig. 1). The front $1^b$ has an exhibit portion $1^f$ wherein samples of the goods sold by the machine may be displayed, and additional exhibiting pockets $1^g$—$1^h$ may be provided for displaying any desired matter.

$1^m$ designates the discharge opening of the casing through which the article vended is ejected.

$3'$ designates an operating knob which is held to the front wall $1^b$ to be removable therewith by having its hub $3^a$ keyed or pinned to the spindle $4^a$ of a shaft receiving hub $4^b$ rotatable in a bearing aperture in the casing front and the hub $4^b$ has a squared bore $4^c$ for a purpose hereinafter explained. The casing front $1^b$ also has a slot $1^s$ and a register exposing glass covered portion $1^p$ near its top, the entire casing being so formed and designed as to present an ornamental appearance to the eye. Within the casing is a removable frame 5 which supports the operating mechanism of my machine and this frame 5 and its carried parts are shown in perspective in Fig. 2 of the drawings. The frame 5 includes a base $5^a$, a main vertical web $5^b$ and a secondary web $5^c$ all being shaped to snugly fit within the casing.

Mounted in suitable apertures $5^d$ in the webs $5^b$ and $5^c$ is a drum shaft 6 which carries the feed drum 7 that rotates with the shaft between the webs $5^b$ and $5^c$ and which has a series of circumferential lugs or pins $6^a$ suitably spaced apart, to coöperate with the apertures $100^a$ of the back strip 100 and exert a positive grip thereon. A guard 8 having a slot $8^a$ to permit passage of the pins $6^a$, coöperates with the drum 7 to hold the strip 100 against the same. The guard 8 is secured to a cross bolt $8^b$ at its upper end and at its lower end is held between a plate $5^e$ projected from the web $5^c$ toward the web $5^b$, and the fixed knife blade plate 50 by screws $50^a$, as shown. The bolt $8^b$ lies directly above the cam shaft 12 but spaced therefrom to permit passage of the strip 100.

Directly above the knife blade 50 is a knife guard 9 slotted at $9^a$ to permit passage of the pin $6^a$ and provided with projecting scraper feet $9^b$ to engage the drum 7 and pass the strip 100 from the drum over the knife $50^b$ and the blade 50. The guard 9 is secured to the web $5^c$ by screws $9^c$. The off-take chute 10 and its side plate $10^a$ are secured to the web $5^c$ in any approved manner. A spindle 11 projects from the web $5^c$ to receive the strip roll 100 which roll is loosely held in place by a disk $11^a$ and collar $11^b$. The cam shaft 12 is mounted in bearing apertures in the webs $5^c$ and $5^b$ and at its forward end is squared as at $12^a$ to fit within the bore $4^c$ of the hub 4 while a ratchet 13 turns with the shaft 12 and coöperates with the pawl 13, spring pressed as at 14 to its engagement with the ratchet. At its rear end a cam $14^x$ is secured to the shaft 12 while a locking disk 15 and a mutilated pinion 16 is secured to the shaft 12 between the cam $14^x$ and the web $5^c$. The cam $14^x$ has a cam groove $14^a$ while the locking disk has an elongated recess $15^a$ the purpose of which will be hereinafter fully explained. The mutilated pinion 16 has a tooth portion $16^a$ and a smooth surface portion $16^b$ to coöperate respectively with the tooth portions $17^a$ and smooth curved surface portions $17^b$ on the periphery of a master gear 17 secured to the drum shaft 6.

19 designates a bearing member projecting from the rear face of the web $5^b$ in which a rock shaft 20 is held. The shaft 20 carries a cam lever 21 which is secured thereto by a set screw $21^a$, or otherwise, and the lever 21 has a friction roller $21^b$ to ride in the groove $14^a$ of the cam 14, so that as the cam rotates the shaft 20 will be oscillated.

22 designates the movable knife which is secured to the shaft 20 through an aperture in the web $5^c$ and coöperates with the fixed knife to effect a shearing action therewith and cut the strip 100 into sections as it is fed to the knives by the drum. The bearing member 19 is provided with a slideway $19^a$ in which an adjustable slide 23 is adjustably held by screws $23^a$ that pass through slots $23^b$ in the slide, the upper edge of the slide 23 serving to coöperate with the pawl $24^a$ of the coin pusher 24, the pawl $24^a$ having its under surface to ride on the upper edge of the slide 23. The cam 14 has its rear face grooved as at $14^b$ to receive a plate $14^c$ that is adjustably held in place by a set screw $14^d$ and is provided with a projection $14^e$ to coöperate with the pawl $24^a$ of the coin pusher 24. The coin pusher 24 consists of an elongated body having slots $24^b$ through which securing bolts $24^c$ pass to secure the pusher 24 to the lugs $5^x$ on the rear face of the web $5^c$, so that the pusher may have longitudinal movement. The pusher 24 also includes a heel $24^d$ which coöperates with an adjusting screw $24^e$ that passes through a lug $5^y$ projecting from the rear face of the web $5^c$, whereby the longitudinal movement of the pusher 24 in one direction may be adjusted for a purpose presently explained. The pusher 24 is held with its stop $24^d$ in contact with the screw $24^e$ by a coil spring $24^f$, as shown.

$24^g$ designates the coin engaging member of the pusher 24, which member is provided with a coin slot $24^h$.

Pivotally secured by a stud $25^a$ to the rear face of the web $5^c$ is the locking and registering lever 25, which lever 25 is provided with a locking heel or pawl $25^b$ to coöperate with the locking disk 15 and at the other end the lever 25 is pivotally secured as at $25^c$ to the operating rod $30^a$ of the registering mechanism 30, hereinafter again referred to. The lever 25 is also provided with an integrally formed coin receiving portion $25^g$ to coöperate with the coin engaging member $24^g$ of the pusher 24, and the coin engaging member $25^g$ is provided with a coin receiving slot $25^h$ in alinement with that of the member $24^h$ of the member $24^g$.

26 designates the coin chute which is secured at its upper end to the rear face of the web $5^c$, which web is provided with a coin slot $5^s$ to register with the coin slot $1^s$ in the casing front and the coin chute 26 projects directly over the coin slots $24^h$ and $25^h$ of the coin engaging members $24^g$—$25^g$ respectively thereof so that the coin as it falls down the slot 26 will enter the slots $24^h$ and $25^h$ and lock the coin receiving members $24^g$ and $25^g$ together. The rear face of the web $5^c$ has lugs $5^r$ through which the registering rod $30^a$ passes. To the upper end of the rod $30^a$ the registering pawl 30$^b$ is pivotally secured. A spring 30$^c$ presses the pawl against its ratchet 30$^d$, hereinafter referred to.

The registering mechanism in my present invention consists of a shaft 31 which carries the "units" disk 32 that is secured to the shaft 31 to turn therewith, the shaft 31 being mounted in bearings in the web 5$^c$ and turnable by a milled finger engaging wheel 35. The "tens" number wheel 33 is loosely mounted on the shaft 31, adjacent the "units" number wheel 32 and the "units" number wheel 32 is provided with a toothed portion 32$^a$ while the adjacent face of the "tens" number wheel 33 is provided with a toothed disk 33$^b$ to coöperate with a pinion 36 on a shaft 38 mounted in bearings in a bracket 39 secured to the rear face of the web 5$^c$, the tooth 32$^a$ coöperating with alternate teeth 36$^a$ of the pinion 36 which are made of double length while the toothed disk 33$^b$ coöperates with all the teeth 36$^a$—36$^b$ of the pinion 36 so that once in each revolution of the "units" wheel 32 the tooth 32$^a$ will rotate the pinion 36 one tooth, which pinion will in turn rotate the "tens" wheel 33 one step. The "tens" wheel 33 is provided with a tooth 33$^a$ of similar form to the tooth 32$^a$ and the "hundreds" wheel 34 is provided with a toothed disk 34$^b$ similar to the disk 32$^b$ and for similar purposes the disk 34$^b$ and the tooth 33$^a$ coöperate with the second pinion 37 which has alternate teeth 36$^a$ and 36$^b$ coöperable respectively with the teeth 33$^a$ and the tooth disk 34$^a$ at times so that for each revolution of the wheel 33 the wheel 34 will be moved one step.

In order to lock the registering mechanism and in turn lock the strip feeding and cutting mechanism from operation after the strip has become exhausted, and when the machine has sold its entire contents, I provide the "hundreds" wheel 34 with a peripheral pocket 34$^a$ into which a pin 39$^a$ on a latch 39 is adapted to drop and the latch 39 comprises a plate having the pins 39$^a$—39$^b$, one of which, 39$^a$, projects through a portion of the web 5$^b$ and is adapted to enter the pocket 34$^a$ once in each revolution of the disk 34 while the pin 39$^b$ is adapted to be projected into the coin slot of the web 5$^c$ at the same time the pin 39$^a$ enters the pocket 34$^a$ of the wheel 34, thus locking the wheel 34 from rotation which as soon as the tooth 33$^a$ of the wheel 33 engages with the pinion 37 locks the wheels 33 and 34 together, and as soon as the wheel 32 is rotated to bring its tooth 32$^a$ in engagement with the pinion 36 then the wheels 32 and 33 will be locked together, thus locking the entire registering mechanism after the ribbon has been exhausted. As soon as the wheel 32 is locked from rotation its ratchet 30$^d$ will also fail to rotate, and therefore any movement of the registering pawl in attempting to turn the ratchet 30$^d$ will be nullified, thus the movement of the rod 30$^a$ is locked and in turn the lever 25 is prevented from oscillating and from releasing its pawl end 25$^b$ from engagement with the locking disk 15, thus holding the cam 14 from rotation and locking the cutting and feeding mechanism. A spring 40 tends to normally force the latch 39 into its locking position.

Having thus described the construction of my invention, the manner in which the same operates will be best explained as follows. Assume the strip 100 with its contents for sale to be placed in position, and the ends of the strip fed to the feeding drum 7, and it is desired to make a sale, the operator then drops the coin into the coin slot which then falls down between the coin engaging members 24$^g$ and 25$^g$, thus locking said members together. The operator then turns the knob 3′ in a clockwise direction, as indicated by the arrows in Fig. 1, which causes the finger portion 14$^e$ of the cam carried member 14$^c$ to pull the coin pusher 24 in the direction of the arrow in Fig. 3, which causes the lever 25 to be rocked to release the pawl 25$^b$ from the locking disk 15 and permits the cam shaft to be rotated. At the same time this occurs the tooth portion 16$^a$ of the mutilated pinion 16, will engage with the toothed portion 17$^a$ of the master gear 17 and rotate the feeding drum. As soon as the drum has rotated the desired amount, the smooth portion 16$^b$ of the periphery of the mutilated pinion 16 will engage with the smooth portion 17$^b$ of the master gear 17 and hence the master gear and feeding drum will not be further rotated. As soon as this engagement has been made the cam causes the movable cutting knife to operate the knives and cut off the projected end of the strip. Continuing this rotation of the cam shaft the locking notch of the locking disk 15 will again come in alinement with the pawl portion 25$^b$ of the lever 25 and stop rotation of the cam shaft as it enters its first position, while simultaneously returning the movable shearing knife to its original position, thus the parts are ready to receive a second coin and go through the same series of operations. As the lever 25 is oscillated when a coin is in engagement with the coin engaging members 24$^g$ and 25$^g$, the rod 30$^a$ is pulled down and its motion is imparted through the pawl to the ratchet 30$^d$ and the "units" wheel 32 rotates one step. In order to release the pawl from the ratchet 30$^d$ when the lever 25 is in its locking position, I provide a pin 41 to engage the pawl and hold it out of contact with the ratchet 30$^d$, it being understood that as soon as the lever 35 begins to oscillate the pawl will be disengaged from the pin 41 and spring pressed against the ratchet 30$^d$ to rotate the registering disks. After the entire contents of the machine have been sold or at any other predetermined time, the latch member 39 locks the registering mechanism which in turn locks the lever 25 from oscillation; the lever 25 then holds the cam shaft from rotation and consequently the feed drum. This locking of the feed mechanism from operation is dependent entirely upon the condition of the registering mechanism.

The article containing strip 100 may be of any approved type, and provided with any approved means for containing the article to be vended, as in this present invention, I make no claim to the specific construction of the strip 100, *per se*, as the same will form the subject-matter of a co-pending application.

While I have not described any particular articles adapted to be sold by this machine, yet the strip 100 may have its pockets 100<sup>a</sup> adapted to receive postage stamps which may be sold by the machine, the contents of one pocket being indicated on the front of the machine, and while the machine shown in the drawings is particularly designed and adapted for selling postage stamps, yet it may be easily adapted for selling railway tickets and other vendable articles of merchandise.

By providing the adjusting screw 24$^e$ the length of the stroke of pusher 24 can be varied to space the coin receiving members 24$^g$ and 25$^g$ a greater or less distance apart as occasion may require to permit the operation of the machine with coins of different diameters, depending upon the cost of the materials to be sold.

From the foregoing description taken in connection with the accompanying drawings, it is thought the complete construction, operation and numerous advantages of my invention will be readily understood by those skilled in the art to which it appertains.

What I claim is:—

1. In a machine of the class described, a vending mechanism, means for operating said vending mechanism, means for controlling said operating mechanism, a registering mechanism coöperating with said operating mechanism, and means for locking said registering mechanism at times and in turn locking the operating mechanism and the vending mechanism.

2. In a machine of the class described, a vending mechanism, combined with means for operating said vending mechanism, means for holding said operating mechanism normally locked, devices for releasing said locking means, and a supplemental locking means for locking said last named locking means and in turn said operating mechanism and vending mechanism.

3. In a machine of the class described, vending mechanism, locking devices therefor to hold said vending mechanism locked, devices for releasing said locking devices, a registering mechanism coöperatively connected with said locking devices and a supplemental locking mechanism for locking said registering mechanism at times.

4. In a machine of the class described, a vending mechanism combined with locking mechanism therefor, devices for releasing said locking mechanism, a registering mechanism coöperatively connected with said locking mechanism, means coöperatively connected with the registering mechanism for locking all of the aforesaid mechanisms from operation at times.

5. A machine of the class described, comprising vending devices combined with locking mechanism therefor, and lock releasing mechanism therefor, a registering mechanism operable by said locking mechanism, means coöperatively engaging said registering mechanism to lock the registering mechanism, and means coöperating with the lock releasing mechanism and the registering mechanism for holding the lock releasing mechanism inoperative when the registering mechanism is locked to hold the vending mechanism locked.

6. A machine of the class described combining a vending machine, a coin controlled mechanism therefor and a registering mechanism, and means engaging the registering mechanism for locking all of said mechanisms at times.

7. A machine of the class described, comprising a vending mechanism, means for normally holding said vending mechanism locked, means for automatically unlocking said vending mechanism at times combined with a registering mechanism coöperatively connected and operated by said locking mechanism, and a supplemental locking means for all of said mechanisms.

8. A machine comprising a vending mechanism, means for normally holding said vending mechanism locked, means for automatically unlocking said vending mechanism at times, combined with a registering mechanism coöperatively connected with said locking means together with means for locking the registering mechanism from operation to lock the first mentioned locking means from operation and in turn hold the vending mechanism locked.

9. A machine of the class described, comprising a feeding and cutting strip mechanism, a coin controlled means for normally holding said feeding and cutting mechanism locked, a coin chute coöperating with said coin controlled mechanism to feed the coin thereto, combined with the registering mechanism coöperatively connected with the coin controlled locking mechanism, together with means for locking the registering mechanism from operation to lock the controlled mechanism from operation and in turn hold the feeding and cutting mechanism locked, said registering mechanism locking means including means for closing the coin chute as the registering mechanism becomes locked, substantially as shown and described.

10. In a machine of the class described, a rotatable operating shaft, devices for holding said rotatable operating shaft locked, said devices comprising a locking disk carried by the rotatable shaft, a pivoted latch lever coöperating with the locking disk, a longitudinally movable pusher, means coöperatively connecting the rotatable operating shaft with the pusher to move the same in one direction, means for normally holding the pusher in an opposite direction, removable means for coöperatively connecting the pusher and the pivoted latch lever at times, a registering mechanism coöperatively connected with the pivoted latch lever and operable thereby, and means coöperating with the registering mechanism for locking the registering mechanism and pivoted latch lever from operation at predetermined times.

11. In a machine of the class described, a rotatable operating shaft, means for holding said rotatable operating shaft locked, said locking means comprising a locking disk carried by the rotatable shaft, a pivoted latch lever coöperating with said locking disk, a longitudinally movable pusher, means coöperatively connecting the rotatable operating shaft with the pusher to move the same in one direction and removable means for connecting the pusher with the pivoted latch lever at times.

12. In a machine of the class described, a rotatable operating shaft, devices for holding said rotatable operating shaft locked, said devices comprising a locking disk carried by the rotatable shaft, a pivoted latch lever coöperating with the locking disk, a longitudinally movable pusher, means coöperatively connecting the rotatable operating shaft with the pusher to move the same in one direction and means for normally holding the pusher in an opposite direction and removable means for coöperatively connecting the pusher and the pivoted latch lever at times.

13. In a machine of the class described, a rotatable operating shaft, coin controlled devices for holding said rotatable operating shaft locked at times, said coin controlled devices comprising a locking disk carried by the rotatable shaft, a pivoted latch lever coöperating with said locking disk and having a coin receiving shoe portion, a longitudinally movable coin pusher having a coin receiving shoe portion to coöperate with the first mentioned coin receiving shoe portion, means coöperatively connecting the rotatable operating shaft with the coin pusher to move the same in one direction, means for normally holding the coin pusher in the opposite direction, together with means for adjusting the movement of the coin pusher in such opposite direction, and means for feeding a coin to the coin shoes.

14. In a machine of the class described, a rotatable operating shaft, coin controlled devices for holding said rotatable operating shaft locked at times, said coin controlled devices comprising a locking disk carried by the rotatable shaft, a pivoted latch lever coöperating with said locking disk and having a coin receiving shoe portion, a longitudinally movable coin pusher having a coin receiving shoe portion to coöperate with the first mentioned coin receiving shoe portion, means coöperatively connecting the rotatable operating shaft with the coin pusher to move the same in one direction, means for normally holding the coin pusher in the opposite direction, together with means for adjusting the movement of the coin pusher in such opposite direction, means for feeding a coin to the coin shoes, and a registering mechanism including an operating pawl coöperatively connected with said pivotally mounted latch lever.

15. In a machine of the class described, a rotatable operating shaft, coin controlled devices for holding said rotatable operating shaft locked at times, said coin controlled devices comprising a locking disk carried by the rotatable shaft, a pivoted latch lever coöperating with said locking disk and having a coin receiving shoe portion, a longitudinally movable coin pusher having a coin receiving shoe portion to coöperate with the first mentioned coin receiving shoe portion, means coöperatively connecting the rotatable operating shaft with the coin pusher to move the same in one direction, means for normally holding the coin pusher in the opposite direction, together with means for adjusting the movement of the coin pusher in such opposite direction, means for feeding a coin to the coin shoes, a registering mechanism including an operating pawl operatively connected with said pivotally mounted latch lever, said registering mechanism including rotatable number-wheels, and a ratchet for coöperating with said operating pawl, and means tending to hold the pawl in engagement with said ratchet.

16. In a machine of the class described, a rotatable operating shaft, coin controlled devices for holding said rotatable operating shaft locked at times, said coin controlled devices comprising a locking disk carried by the rotatable shaft, a pivoted latch lever coöperating with said locking disk and having a coin receiving shoe portion, a longitudinally movable coin pusher having a coin receiving shoe portion to coöperate with the first mentioned coin receiving shoe portion, means coöperatively connecting the rotatable operating shaft with the coin pusher to move the same in one direction, means for normally holding the coin pusher in the opposite direction, together with means for adjusting the movement of the coin pusher in such opposite direction, means for feeding a coin to the coin shoes, a registering mechanism including an operating pawl operatively connected with said pivotally mounted latch lever, said registering mechanism including rotatable number-wheels and a ratchet for coöperating with said operating pawl, and means tending to hold the pawl in engagement with said ratchet, and means for holding the pawl out of engagement with the ratchet at times.

17. In a machine of the class described, a rotatable operating shaft, coin controlled devices for holding said rotatable operating shaft locked at times, said coin controlled devices comprising a locking disk carried by said rotatable shaft, a pivoted latch lever coöperating with said locking disk and having a coin receiving shoe portion, a longitudinally movable coin pusher having a coin receiving shoe portion to coöperate with the first mentioned coin receiving shoe portion, means coöperatively connecting the rotatable operating shaft with the coin pusher to move the same in one direction, means for normally holding the coin pusher in the opposite direction, together with means for adjusting the movement of the coin pusher in such opposite direction, means for feeding a coin to the coin shoes, a registering mechanism including an operating pawl operatively connected with said pivotally mounted latch lever, and means for locking all of the aforesaid mechanism from operation at predetermined times.

18. In a machine of the class described, a coin controlled locking mechanism, said coin controlled locking mechanism comprising a rotatable latch disk, a pivoted latch lever coöperating with said latch disk and having a coin receiving shoe portion, a coin pusher having a shoe portion to coöperate with said first named shoe portion, and means for operating said coin pusher to force the coin against the shoe portion of the pivotally mounted latch lever to rock the same and disengage it from the latch disk at times.

19. In a machine of the class described, a rotatable operating shaft, devices for holding said rotatable operating shaft locked, said devices comprising a locking disk carried by the rotatable shaft, a pivoted latch lever coöperating with the locking disk, a longitudinally movable pusher, means coöperatively connecting the rotatable operating shaft with the pusher to move the same in one direction, means for normally holding the pusher in an opposite direction, removable means for coöperatively connecting the pusher and the pivoted latch lever at times, a registering mechanism coöperatively connected with the pivoted latch lever and operable thereby, means coöperating with the registering mechanism for locking the registering mechanism and pivoted latch lever from operation at predetermined times.

WILLIAM CYRUS BRIGGS.

Witnesses:
ANDREW HERO,
JNO. J. WARD.